United States Patent [19]

Crapo

[11] Patent Number: 4,847,712
[45] Date of Patent: Jul. 11, 1989

[54] DISC DRIVE SPINDLE MOTOR WITH LOG COGGING TORQUE

[75] Inventor: Allan D. Crapo, Santa Cruz County, Calif.

[73] Assignee: Seagate Technology, Inc., Scotts Valley, Calif.

[21] Appl. No.: 46,234

[22] Filed: May 4, 1987

[51] Int. Cl.⁴ .................... G11B 17/00; H02K 3/00; H02P 7/00
[52] U.S. Cl. ................... 360/99.08; 310/268; 318/254
[58] Field of Search ............ 360/97.99; 310/68, 156, 310/268; 318/138, 254

[56] References Cited

U.S. PATENT DOCUMENTS

| | | | |
|---|---|---|---|
| 4,528,485 | 7/1985 | Boyd, Jr. | 318/138 |
| 4,535,276 | 8/1985 | Yokobord | 318/254 |
| 4,605,874 | 8/1986 | Whitellsy | 310/268 |

Primary Examiner—John H. Wolff
Attorney, Agent, or Firm—Flehr, Hohbach, Test, Albritton & Herbert

[57] ABSTRACT

A spindle motor is adapted to support a hub with one or more discs thereon. The motor comprises a stator with nine windings of equal cross-section and a rotor with eight equally spaced poles radially oriented with respect to the stator. The rotor windings are connected to define first, second and third phases.

1 Claim, 3 Drawing Sheets

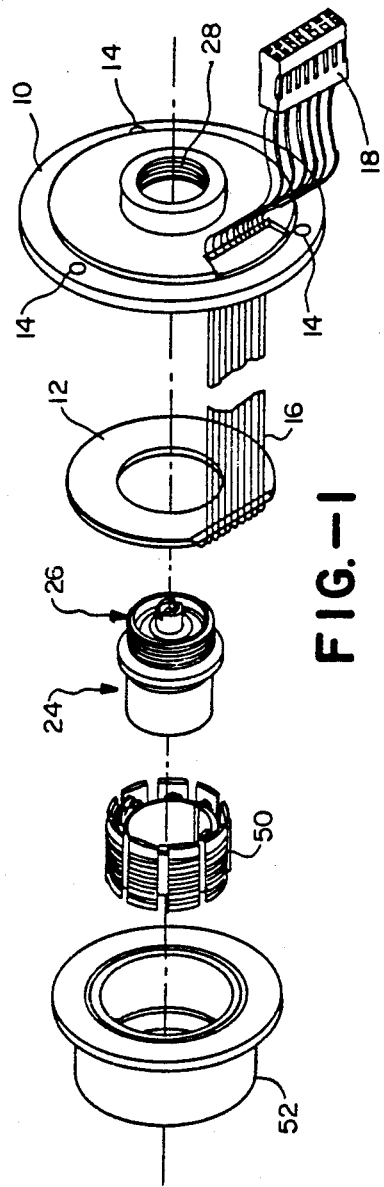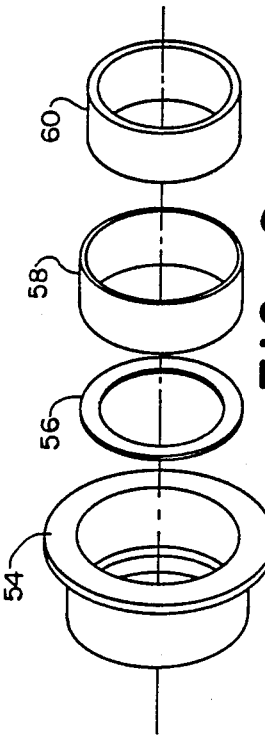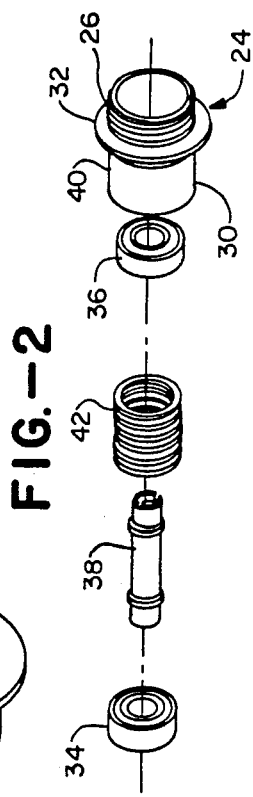

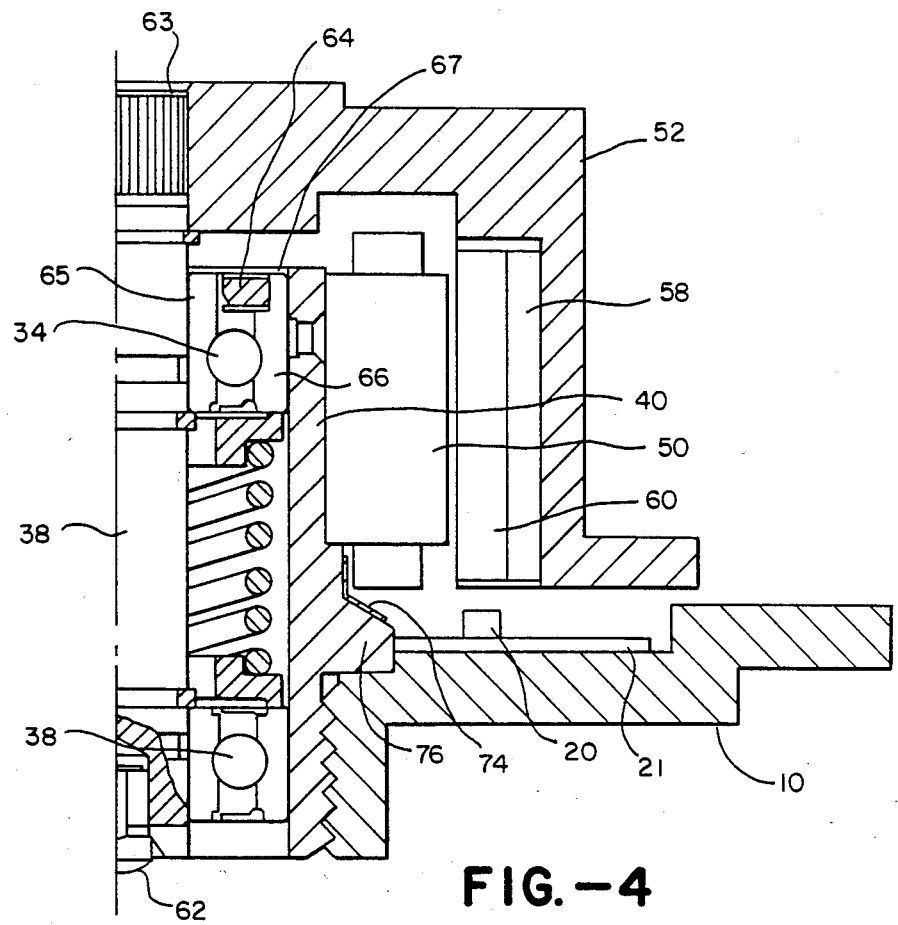
FIG.—4
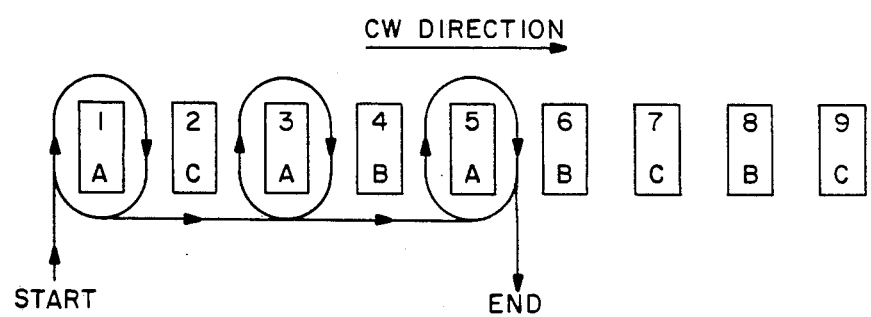
| PHASE A | 1 | 3 | 5 |
| PHASE B | 4 | 6 | 8 |
| PHASE C | 7 | 9 | 2 |
FIG.—7

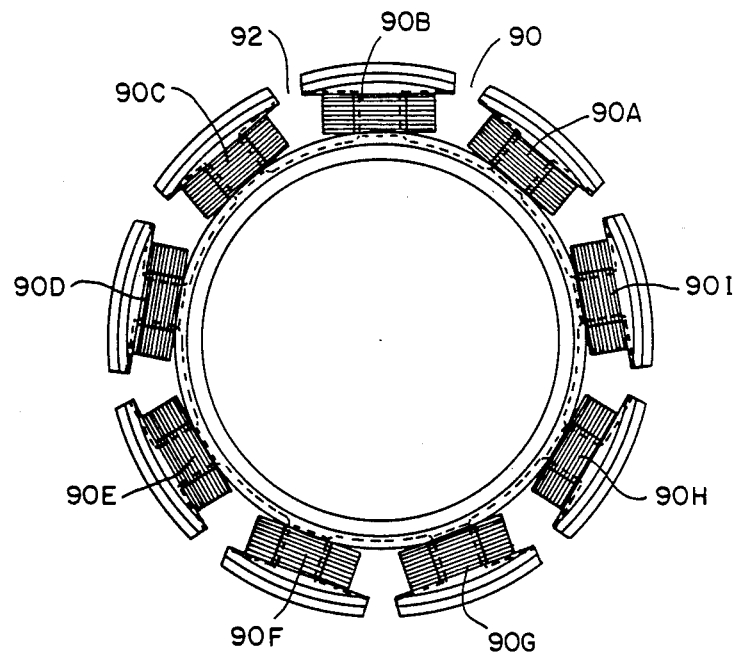
FIG.—5
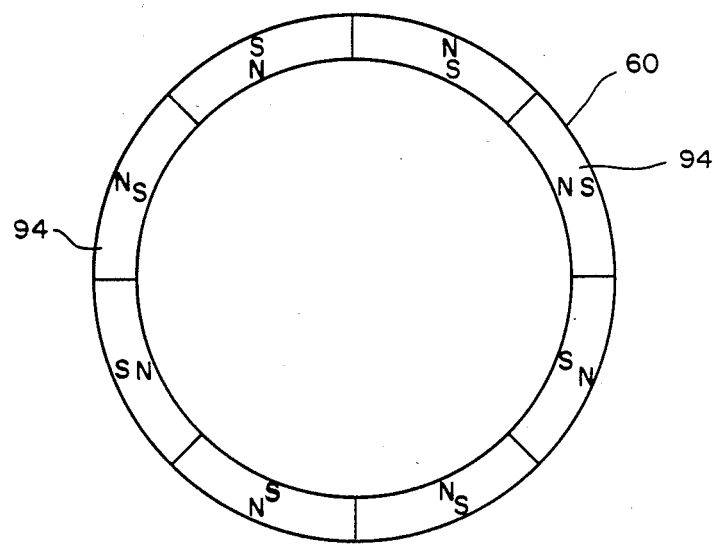
FIG.—6

DISC DRIVE SPINDLE MOTOR WITH LOG COGGING TORQUE

CROSS-REFERENCE TO RELATED APPLICATION

The motor of this invention is especially useful in disc drives of the type described in U.S. application Ser. No. 914,690 filed Oct. 2, 1986, entitled "Rotary Actuator" and incorporated herein by reference.

This invention relates generally to the field of electrical generator or motor structures, and more particularly to rotary magnetic motors and the construction of rotors and stators therefor.

BACKGROUND OF INVENTION

The common objective of all disc drive manufacturers is to design smaller, quieter disc drives having greater storage capacity, while at the same time minimizing manufacturing costs.

As is well known, disc drives record and reproduce information on a constantly rotating disc or discs. Many disc drives, to maximize their capacity, are now made with multiple discs rotating on a single spindle. It is essential to the proper operation of the disc drive that the spindle motor which rotates the spindle and the discs be capable of smoothly and immediately starting the disc in rotation, bringing it up to a constant rotational speed, and maintaining that rotational speed under all operating conditions. In order to meet this objective, it is necessary to provide a spindle motor having a high starting torquej. This is achieved by providing a motor design wherein the minimum torque at any angular position is as high as possible. Further, during continuous speed operation, the motor must have a good fixed average torque, so that there is no lag in the rotation of the discs. These operating conditions are normally expressed as requiring a motor with a low torque ripple.

A critical problem in achieving low torque ripple is the existence of cogging torque. Cogging torque occurs when the lines separating the poles of the magnet line up with the slot openings between the coils, or windings of the stator. A number of prior art approaches have been taken to minimize the cogging torque and thereby provide a motor with a low torque ripple. One prior art approach is to provide a magnet with a skewed magnetic pattern. However, the result of such a design is a degradation in several of the other operating characteristics of the motor. Another approach commonly taken is to provide very thin slots between adjacent motor windings on the stator. However, this makes the motor extremely difficult to wind.

SUMMARY OF INVENTION

It is an objective of this invention to provide a motor which is especially useful as the spindle motor in a disc drive having a low torque ripple. More particularly, it is an objective herein to provide a spindle motor wherein the cogging torque is minimized.

A further objective herein is to provide a motor for a disc drive in which the windings may be wound on the stator laminations very efficiently by virtue of the fact that the slots are relatively wide. In view of the discussion above, however, it is also necessary to provide a design wherein, although the slots between adjacent windings are wide, the cogging torque remains low.

A further objective is to provide a disc drive spindle motor that makes very efficient use of the copper wire and the steel magnet which make up the rotor and stator of the motor, while maintaining a low cogging torque.

These and other objectives of this invention are achieved in a disc drive spindle motor, comprising a stator having nine evenly distributed windings separated by relatively large slot openings, the motor further comprising a rotor having a radially polarized eight-pole magnet, the magnet being carried in the hub which will support the discs on its outer surface. Rather than use a spatially evenly distributed winding arrangement, as would normally be expected, the motor of this invention has three phases, the first phase starting at any winding end of the nine windings and incorporates the windings n, n+2 and n+4 connected in series and being wound in the same direction; the second phase starting at the winding n+3, and incorporating the windings n+5 and n+7 connected in series and being wound in the same direction; and the third phase beginning with the winding n+6 and incorporating the windings n+8 and n+1, connected in series and wound in the same direction. The starting points of the three phases are selected to provide the necessary 120° phase shift between windings. It has been found that the use of this winding sequence in a nine-slot, eight-pole motor provides a motor with extremely low torque ripple and minimal cogging torque.

BRIEF DESCRIPTION OF DRAWINGS

The features and advantages of this invention may be better understood by referring to the accompanying drawings, wherein FIG. 1 is an exploded view of the spindle motor herein;

FIG. 2 is an exploded view of the elements of the rotor herein;

FIG. 3 is an exploded view of the bearing cartridge assembly herein;

FIG. 4 is a more detailed cross-sectional view of the bearing cartridge herein;

FIG. 5 illustrates the windings of the coils on the stator herein and illustrates the spacing provided by the relatively wide slots between adjacent windings;

FIG. 6 is a plan view of the eight-pole rotor magnet of this invention; and

FIG. 7 illustrates the winding sequence of this invention.

DETAILED DESCRIPTION OF PREFERRED EMBODIMENT

Referring to FIG. 1, the primary elements of a motor especially useful for mounting in a disc drive to drive the spindle and rotate the disks at a constant speed are shown. The motor is adapted for mounting on a base casting 10 that has a printed circuit board 12 mounted thereon. The base casting 10 can be fastened to the base housing of a disc drive to permanently seat the spindle motor in the base of the housing; to this end, screw holes 14 are provided in the edge of the base casting 10. Alternatively, by providing a threaded opening of the proper diameter in the base casting itself, the spindle motor designed in accordance with this invention may be mounted directly in the base casting. Electrical signals for controlling the position of the motor reach this printed circuit board 12 and specifically the wiring pattern thereon through the connecting lead wires 16, which are led out through the base casting 10 to a connector 18. This printed circuit board is used to detect the instantaneous position of the rotor through Hall effect devices 20 (FIG. 4) mounted on the surface of the printed circuit board directly below the path of rotation of the rotor. The stator subassembly 24, details of which are shown in FIG. 3, includes a threaded portion 26 which is easily screwed into the mating threaded portion 28 of the base casting 10.

Referring to FIG. 3, it can be seen that the essential elements of the stator subassembly, described in greater detail with reference to the sectional view of FIG. 4, comprise the housing tower 30, which includes the threaded portion 26 on the base thereof, and a flange 32 which seats down against the base casting 10. FIG. 3 also shows the upper and lower ball bearings 34, 36 which are to fit over the upper and lower portions of the shaft 38 inside the tower portion 40 of the overall housing 24. Separation between the upper and lower ball bearings is maintained by the coil spring 42. The shaft 38 is seated in the base 10 and supports the disc carrying hub 52 at its upper end.

Returning to FIG. 1, the remaining elements of the overall assembly comprise a nine slot wound stator 50 which is fastened in place on the outside of the tower shaft 40, and a rotor hub 52. The stator assembly will be explained in greater detail with reference to FIGS. 4–5. The elements of the rotor hub are shown in exploded fashion in FIG. 2 and comprise the hub 54 to which the discs are mounted, and end ring 56 which fits within the hub, a return ring 58 and eight-pole magnet ring 60. The magnet of the rotor is an eight-pole magnet designed in accordance with known techniques to provide in combination with the nine sections of the stator a highly efficient motor having little cogging torque and a highly efficient use of copper and steel in its construction.

Referring to the details of FIG. 4, the motor shaft 38 is shown surrounded by the upper and lower bearings 34 and 38. A ground button 62 is provided on the end of this bearing shaft to minimize stray eddy currents.

The upper ball bearing 34 which is an integral assembly includes a magnetic seal 64 as an integral part thereof. This is provided in order to concentrate the magnetic return path. Since the inner race 65 of the upper bearing rotates with the shaft, while the outer race 66 remains stationary, a magnetic fluid may be placed in a small channel 67 adjacent the outer shaft in order to concentrate the magnetic return path.

The stator 50 is provided bonded to the outer surface of the housing tower 40 which surrounds shaft 38. The structure of the stator and its winding pattern appears clearly in FIGS. 6–7. An insulator 74 is provided at the lower portion of the tower 40 and on flange 76 of the tower 40 adjacent the stator laminations to eliminate possible shorting of the stator against the steel material of the housing tower.

Finally, referring to FIG. 5, the arrangement of the windings that form the stator 50 that is bounded to the upper portion of the housing tower is shown in plan view.

Each of the windings 90 is well separated from the next adjacent winding by a relatively wide slot 92. By providing this winding arrangement on a stator mounted on a stack that faces a rotor 60 rotating outside the stack, the windings can be very easily assembled, resulting in a maximum efficient use of the copper in the windings. The rotor itself is shown in FIG. 6, and comprises eight poles 94, each identified by the letters N, S which indicate the radial orientation of the poles. By adopting this design, with each pole taking up 45° and providing a radial flux orientation, the deficiency of prior art designs that used skewed magnetic structures to reduce cogging torque are avoided.

The winding sequence of this invention is shown in FIG. 7. As can be seen, given the nine windings, the first phase, Phase A, is connected using windings all connected in the clockwise direction, starting with any first pole which may be considered one or n, and then incorporating poles n+2 and n+4. In order to provide the necessary 120° phase shift, the next phase starts with pole 4, or pole n+3, and includes poles n+5 and n+7. The final phase includes poles n+6 and n+8 and to complete the sequence, pole n+1. By using this sequence, it has been found that a minimal cogging torque occurs, and a low ripple motor output is achieved.

Modifications of this invention may occur to a person of skill in the art who studies this disclosure. Therefore, the scope of this invention is to be limited only by the following claims.

What is claimed:

1. In a disc drive comprising a casting having a base portion supporting a spindle motor for rotating a hub supporting one or more discs, said spindle motor comprising a central support shaft having one end fixed in said base and a second end supporting said hub for rotation thereon,
a stator mounted on said shaft comprising nine windings of equal cross-section separated by slots,
a magnetic rotor supported within the hub having eight equally spaced poles radially oriented with respect to said stator and said central support shaft,
said rotor windings being connected to define first, second and third phases, said first phase comprising the first, third and fifth of said nine windings, the second phase, comprising the fourth, sixth and eighth of said nine windings, the third phase, comprising the seventh, ninth and second of said nine windings, the three windings of each phase being connected in series to define a spindle motor having low cogging torque.

* * * * *

UNITED STATES PATENT AND TRADEMARK OFFICE
CERTIFICATE OF CORRECTION

PATENT NO. : 4,847,712
DATED : July 11, 1989
INVENTOR(S) : Allan D. Crapo

It is certified that error appears in the above-identified patent and that said Letters Patent is hereby corrected as shown below:

In the title, after [54], alter the title to read as follows:

--DISC DRIVE SPINDLE MOTOR WITH LOW COGGING TORQUE--

Signed and Sealed this

Twenty-second Day of May, 1990

Attest:

HARRY F. MANBECK, JR.

*Attesting Officer*   *Commissioner of Patents and Trademarks*